(12) United States Patent
Jang et al.

(10) Patent No.: US 10,155,562 B2
(45) Date of Patent: Dec. 18, 2018

(54) HYDRAULIC BRAKING DEVICE

(71) Applicant: LEE CHI ENTERPRISES COMPANY LTD., Changhua County (TW)

(72) Inventors: Jr-Yuan Jang, Changhua County (TW); Wen-Tsung Liu, Changhua County (TW)

(73) Assignee: LEE CHI ENTERPRISES COMPANY LTD., Changhua, Changhua County (TW)

( * ) Notice: Subject to any disclaimer, the term of this patent is extended or adjusted under 35 U.S.C. 154(b) by 0 days.

(21) Appl. No.: 15/499,299

(22) Filed: Apr. 27, 2017

(65) Prior Publication Data

US 2017/0313377 A1    Nov. 2, 2017

(30) Foreign Application Priority Data

Apr. 28, 2016    (TW) .............................. 105206046 U

(51) Int. Cl.
| | | |
|---|---|---|
| *F16D 55/00* | (2006.01) | |
| *B62L 1/10* | (2006.01) | |
| *B62K 19/38* | (2006.01) | |
| *B62L 1/00* | (2006.01) | |
| *F16D 55/225* | (2006.01) | |
| *B62L 3/00* | (2006.01) | |

(Continued)

(52) U.S. Cl.
CPC ................ *B62L 1/10* (2013.01); *B62K 19/38* (2013.01); *B62L 1/005* (2013.01); *F16D 55/225* (2013.01); *B62L 3/00* (2013.01); *B62L 3/023* (2013.01); *F16D 2121/04* (2013.01)

(58) Field of Classification Search
CPC ........................................................ B62L 1/10
See application file for complete search history.

(56) References Cited

U.S. PATENT DOCUMENTS

| | | | | |
|---|---|---|---|---|
| 4,114,409 A * | 9/1978 | Scire | ...................... | B62H 5/001 |
| | | | | 70/225 |
| 6,374,957 B1 * | 4/2002 | Krumbeck | ................ | B62L 1/10 |
| | | | | 188/24.12 |

FOREIGN PATENT DOCUMENTS

| DE | 102011003274 A1 * | 8/2012 | ................ B62L 1/10 |
|---|---|---|---|
| EP | 2881293 B1 * | 3/2017 | ................ B60T 1/06 |

OTHER PUBLICATIONS

Machine translation of DE 102011003274 (no date).*
Machine translation of EP 2881293 (no date).*

* cited by examiner

*Primary Examiner* — Nicholas J Lane
(74) *Attorney, Agent, or Firm* — Muncy, Geissler, Olds & Lowe, P.C.

(57) ABSTRACT

A hydraulic braking device includes an engaging base, a hydraulic brake, and a locking device. The hydraulic brake is provided on the engaging base. The locking device is adapted to fix the engaging base on a suspension fork of a bicycle, and includes a bolt and a handle, wherein the bolt passes through the engaging base to be screwed into a tapped hole of the suspension fork. The handle has a cam-shaped head pivotally connected to the bolt, and is pivotable between a first position and a second position. When the handle is located at the first position, the head presses against the engaging base to fix the engaging base on the suspension fork. When the handle is located at the second position, the engaging base is no longer being pressed against by the head, whereby the engaging base is movable relative to the suspension fork.

10 Claims, 8 Drawing Sheets

(51) Int. Cl.
*B62L 3/02* (2006.01)
*F16D 121/04* (2012.01)

HYDRAULIC BRAKING DEVICE

BACKGROUND OF THE INVENTION

1. Technical Field

The present invention relates to a braking device for a bicycle, and more particularly to a hydraulic braking device.

2. Description of Related Art

Since the rise of environmental awareness in recent years, people starts to pay more attention to issues of energy saving, carbon reduction, and environmental protection. In addition, exercising for health has also become a trend nowadays. Cycling neither consumes petrochemical energy nor produces exhaust gas which is harmful to the environment, and therefore is a popular choice for living an environmental friendly and healthy lifestyle.

To protect the safety of riders, some types of bicycles such as mountain bikes use rim brakes to reduce the speed. A rim brake applies braking force by friction brake pads to both sides of the rim of a rotating wheel, whereby to eventually stop the wheel and the bicycle. The brake pads can be operated by pulling a brake cable. However, a brake cable may become slack after being used for a long period, causing an adverse effect on the braking performance. In a worst case, a brake cable may be even broken, and therefore cannot slow down the bicycle at all, putting the rider in danger. In light of this, some manufacturers choose to operate brake pads through hydraulic mechanism instead, which increases the durability and reliability of a braking system.

A conventional hydraulic braking device, such as the products modeled HS33R manufactured by MAGURA, includes an engaging base, a hydraulic brake, and a locking device, wherein the hydraulic brake is provided on the engaging base. The locking device is adapted to fix the engaging base on a suspension fork (i.e., the front fork or the rear fork) of a frame. The locking device 10 shown in FIG. 1 includes a bolt 12 and a locking rod 14, wherein an end of the bolt 12 passes through an engaging base 16 to be screwed into a threaded hole 182 of a suspension fork 18. A body of the bolt 12 has an annular recess 122 near another end of the bolt 12. The locking rod 14 has an eccentric locking portion 142, and is rotatably provided in the engaging base 16. By engaging the locking portion 142 with the annular recess 122, the engaging base 16 can be fixed on the suspension fork 18.

While assembling said conventional hydraulic braking device, a length of the bolt 12 being screwed into the threaded hole 182 has to be adjusted first, or the locking portion 142 may not be located at a position corresponding to the annular recess 122 when the engaging base 16 fits around the bolt 12. If the length of the bolt 12 being screwed into the threaded hole 182 is not appropriately adjusted, the engaging base 16 cannot be fixed due to the mismatch between the positions of the locking portion 142 and the annular recess 122. Therefore, it is common to adjust the bolt 12 several times in order to fix the engaging base 16 on the suspension fork 18, which is inconvenient.

BRIEF SUMMARY OF THE INVENTION

In view of the above, the primary objective of the present invention is to provide a hydraulic braking device, which allows the engaging base to be easily fixed on the suspension fork.

To achieve the objective of the present invention, the present invention provides a hydraulic braking device, which is adapted to be engaged with a suspension fork of a bicycle, wherein the suspension fork has at least one tapped hole. The hydraulic braking device includes at least one engaging base, at least one hydraulic brake, and at least one locking device. The at least one hydraulic brake is provided on the at least one engaging base, and includes a hydraulic cylinder and a brake pad, wherein the brake pad is moveable by the hydraulic cylinder. The at least one locking device includes bolt and a handle, wherein the bolt of each of the at least one locking device is adapted to be screwed into one of the at least one tapped hole after passing through one of the at least one engaging base. The handle of each of the at least one locking device has a cam-shaped head pivotally connected to the corresponding bolt. The handle pivots between a first position and a second position. When the handle is located at the first position, the head presses against one of the at least one engaging base, whereby to fix said engaging base on the suspension fork. When the handle is located at the second position, said engaging base is no longer being pressed against by the head, whereby said engaging base is movable relative to the suspension fork.

With the aforementioned design, the engaging base could be easily fixed on the suspension fork by rotating the bolt to a proper position and then pulling the handle to press the head of the handle against the engaging base, which could effectively fix the problem that the locking portion of a conventional hydraulic braking device may fail to match the annular recess of the bolt.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
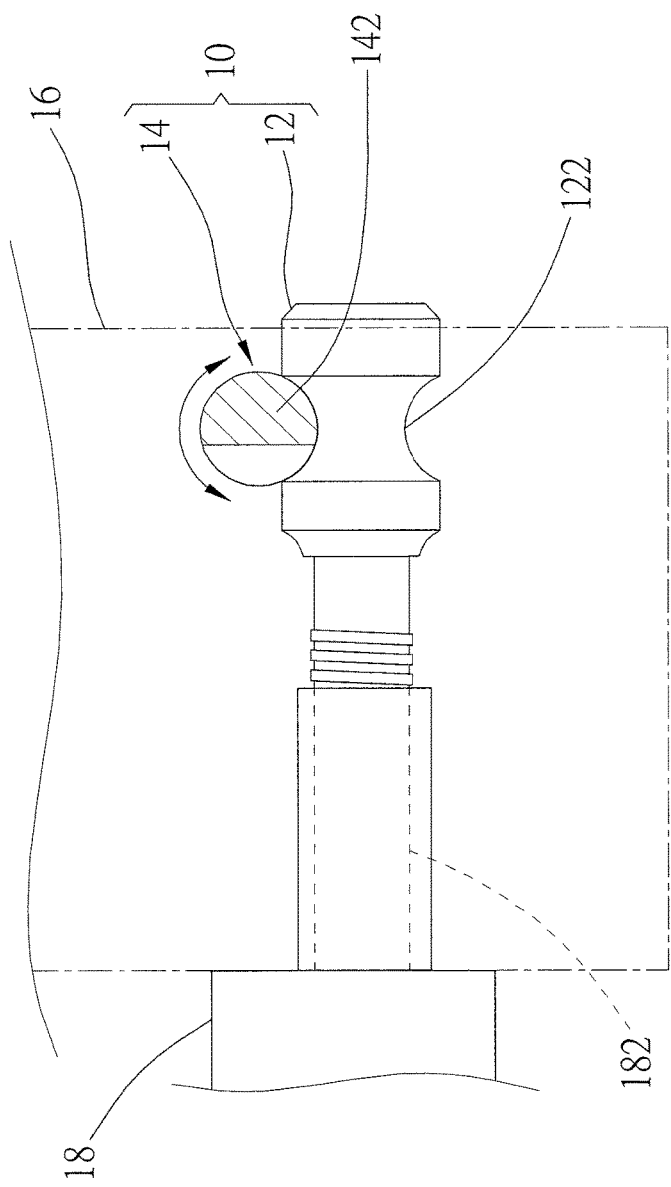
FIG. 1 is a schematic diagram, showing the locking device of a conventional hydraulic braking device engaging with the engaging base.

A hydraulic braking device 100 of a first embodiment of the present invention is illustrated in FIG. 2 to FIG. 5. The hydraulic braking device 100 is adapted to be engaged with a suspension fork 200 of a bicycle, wherein the suspension fork 200 could be a front fork or a rear fork of the bicycle. The suspension fork 200 has two stanchions 201 and two fixing bases 202, wherein the stanchions 201 are respectively located on two lateral sides of a wheel W of the bicycle, and the fixing bases 202 are respectively engaged with the stanchions 201. Each of the fixing bases 202 has a stopping surface 203 and a rod 204 extending from the corresponding stopping surface 203, wherein each of the rods 204 has a tapped hole 204a located in an axial direction thereof, and is fitted around by an O-ring 205.

The hydraulic braking device 100 includes a support 20, two engaging bases 24, two hydraulic brakes 36, and two locking devices 40, wherein the support 20 has two arms 22 corresponding to each other. Each of the aims 22 has an elongated hole 222 (i.e., a second elongated hole of the present invention), wherein a major axis of each of the elongated holes 222 is in a vertical direction. A positioning hole 224 is provided above each of the elongated holes 222. The rod 204 of each of the fixing bases 202 passes through one of the elongated holes 222, respectively, so that each of the O-rings 205 is located between one of the stopping surfaces 203 and the corresponding arm 22.

Figure 2:
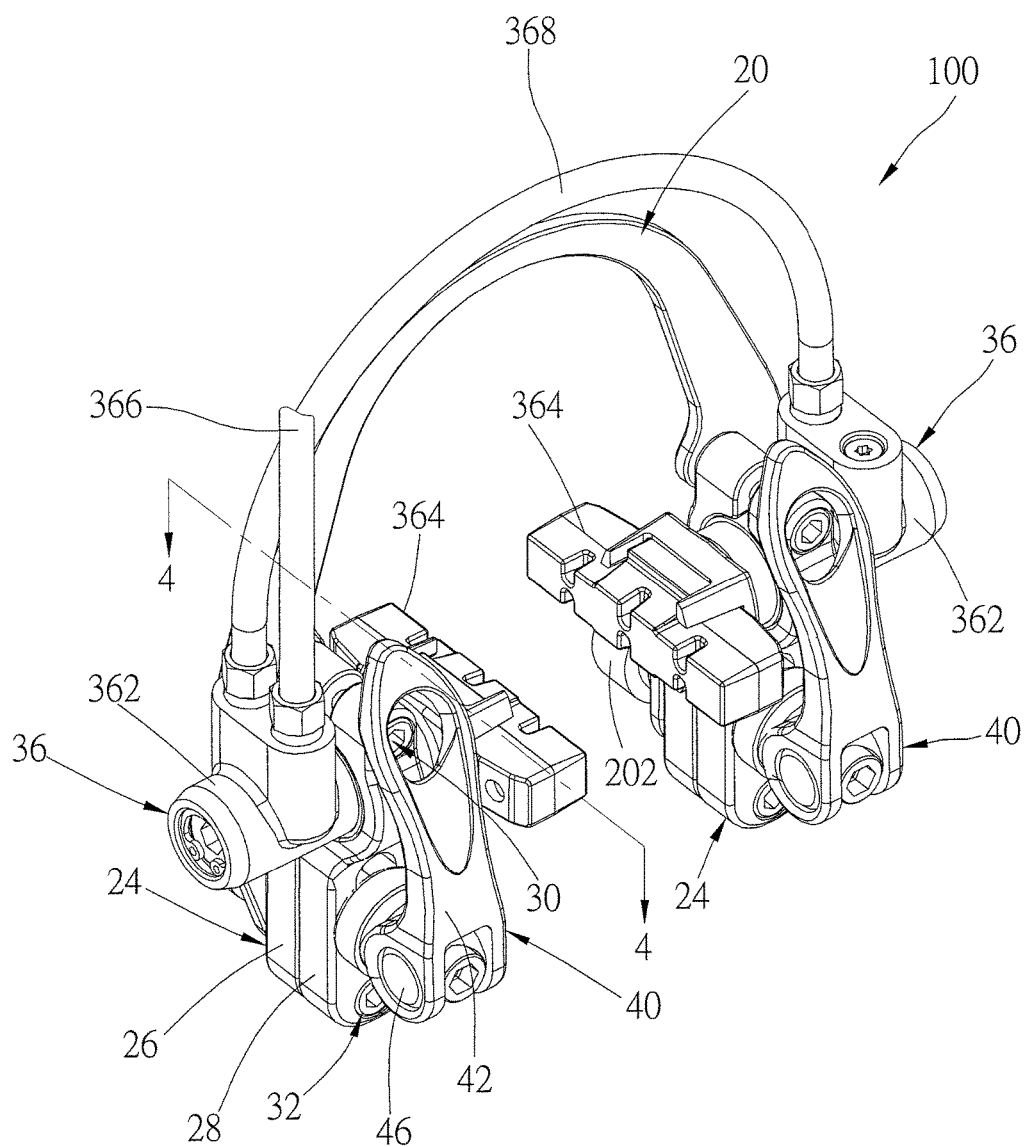
FIG. 2 is a perspective view of the hydraulic braking device of a first embodiment of the present invention.
Figure 3:
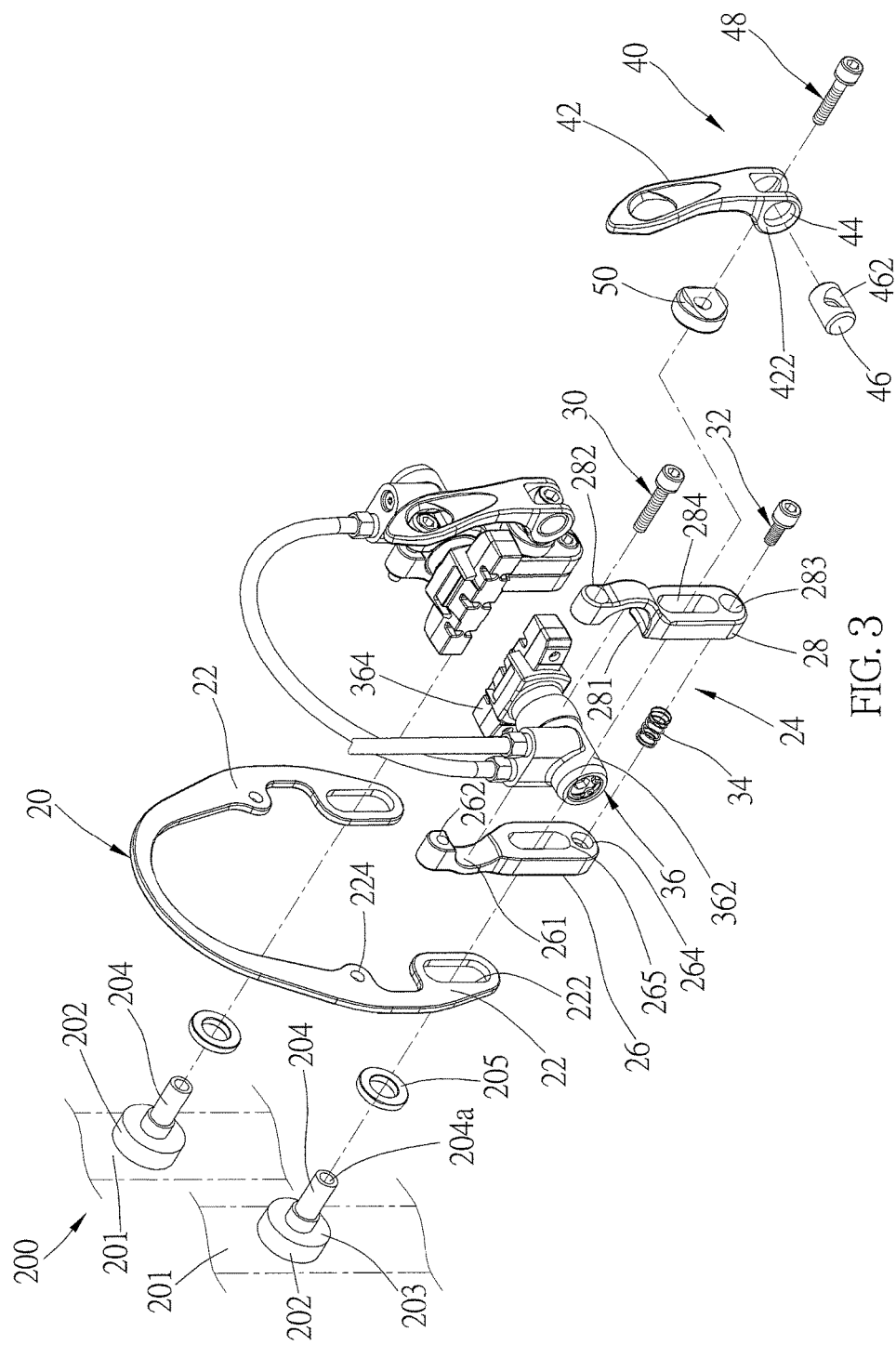
FIG. 3 is an exploded perspective view of the hydraulic braking device of the first embodiment of the present invention.

Since each of the engaging bases 24, each of the hydraulic brakes 36, and each of the locking devices 40 of the first embodiment provided on each of the fixing bases 202 has the same structure with their counterparts, we will simply explain the details of the engaging base 24, the hydraulic brake 36, and the locking device 40 illustrated on the left side of FIG. 2 through the following paragraphs.

The engaging base 24 includes a first bolt 30, a second bolt 32, a spring 34, a first base 26, and a second base 28 matching the first base 26, wherein the first base 26 has a first recess 261, an upper tapped hole 262 above the corresponding first recess 261, and a lower tapped hole 263 below the corresponding first recess 261. The first base 26 further has a counterbore 264 facing the second base 28, wherein a diameter of the counterbore 264 is greater than a diameter of the lower tapped hole 263, and the lower tapped hole 263 is located at an inner end of the counterbore 264. The second base 28 has a second recess 281 corresponding to the first recess 261, wherein the second recesses 281 has an upper perforation 282 and a lower perforation 283 respectively corresponding to the upper tapped hole 262 and the lower tapped hole 263. A head 302 of the first bolt 30 and a head 322 of the second bolt 32 respectively have a driven portion 304, 324 recessed therein, wherein the driven portions 304, 324 are adapted to rotate the first bolt 30 and the second bolt 32, respectively. The driven portions 304, 324 in the current embodiment are hexagonal. The first bolt 30 passes through the upper perforation 282 and the upper tapped hole 262 to be screwed into the upper tapped hole 262, and extends into one of the positioning holes 224 of the support 20, wherein the head 302 of the first bolt 30 abuts against the second base 28. The second bolt 32 passes through the lower perforation 283 and the lower tapped hole 263 to be screwed into the lower tapped hole 263. The spring 34 fits around the second bolt 32, and is located between the first base 26 and the second base 28, wherein at least a part of the spring 34 is received in the counterbore 264 with an end thereof abutting against the inner end of the counterbore 264, while another end thereof abuts against the second base 28. In addition, the first base 26 and the second base 28 respectively have an elongated hole 265, 284 extending in a vertical direction, wherein the elongated hole 265 of the first base 26 is located between the first recess 261 and the counterbore 264, while the elongated hole 284 of the second base 28 is located between the second recess 281 and the lower perforation 283. The elongated holes 265, 284 constitute a first elongated hole of the engaging base 24 of the present invention. The rod 204 of the fixing base 202 of the suspension fork 200 on one side passes through the elongated holes 265, 284 of the corresponding first base 26 and second base 28.

The hydraulic brake 36 includes a hydraulic cylinder 362 and a brake pad 364, wherein the hydraulic cylinder 362 is provided in the first recess 261 and the second recess 281 of the engaging base 24, and therefore is located between the first bolt 30 and the second bolt 32 to be held by the first base 26 and the second base 28. The hydraulic cylinder 362 is connected to an inlet tubing 366, and connected to the hydraulic cylinder 362 on the other side through a tubing 368, whereby the two hydraulic cylinders 362 on both sides could act synchronously. The brake pad 364 is connected to an acting portion of the hydraulic cylinder 362 to be driven by the hydraulic cylinder 362 to move in a direction parallel to an axial direction of the wheel W, whereby to abut against or move away from a rim of the wheel W.

The locking device 40 includes a handle 42, a shaft 46, a bolt 48, and a block 50, wherein the handle 42 has a cam-shaped head 422 which has a shaft bore 44 provided therein. A surface of the head 422 respectively has a first surface 422a and a second surface 422b located at two positions perpendicular to each other. A distance between a center of the shaft bore 44 and the first surface 422a is greater than a distance between the center of the shaft bore 44 and the second surface 422b. The handle 42 has two hollow portions, including a first hollow portion 424 and a second hollow portion 426. The first hollow portion 424 goes through the head 422 to communicate with the shaft bore 44, and has a side opening 424a on a surface thereof opposite to the first surface 422a. The second hollow portion 426 goes through a body near a free end of the handle 42.

The shaft 46 passes through the shaft bore 44, with a body thereof located in the first hollow portion 424, wherein the body of the shaft 46 has a perforation 462 located in a radial direction thereof. The perforation 462 has a large diameter section 462a and a small diameter section 462b, wherein a diameter of the large diameter section 462a is greater than that of the small diameter section 462b. A wall connecting the large diameter section 462a and the small diameter section 462b is defined as an abutted portion 462c.

Figure 4:
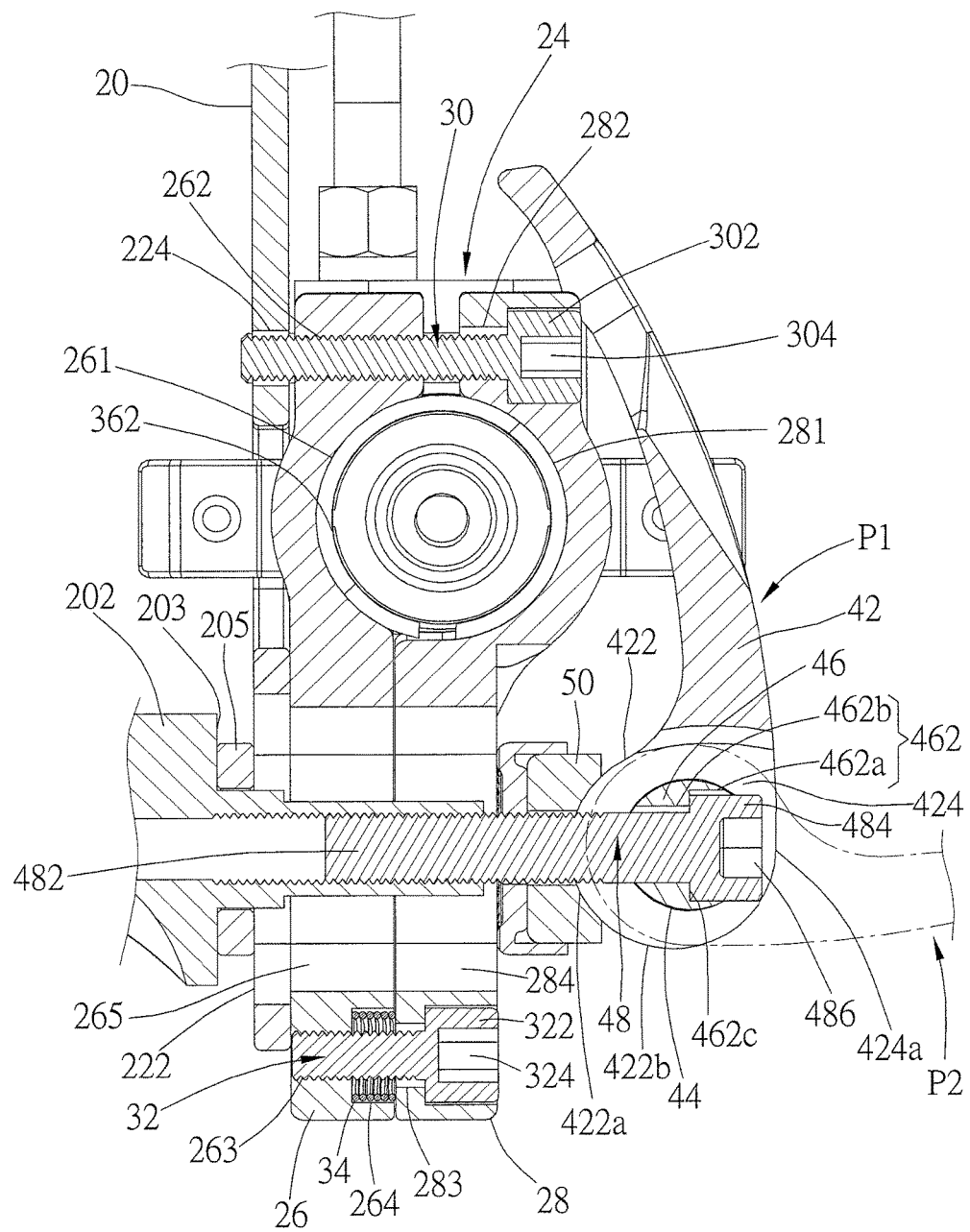
FIG. 4 is a sectional view along the 4-4 line in FIG. 2.

The bolt 48 has a threaded body 482 and a head 484, wherein the threaded body 482 sequentially passes through the first hollow portion 424 of the handle 42, the perforation 462 of the shaft 46, a through hold of the block 50, and two elongated holes 265, 284 of the of the engaging base 24 (more specifically, the elongated hole 284 of the second base 28 first, and then the elongated hole 265 of the first base 26) to be screwed into the tapped hole 204a of the corresponding rod 204. At least a part of the head of the bolt 48 is located in the large diameter section 462a of the perforation 462 of the shaft 46, abutting against the abutted portion 462c. The head 486 has a driven portion 486 recessed thereinto, wherein the driven portion 486 is adapted to be driven to rotate the bolt 48. In the current embodiment, the driven portion 486 is hexagonal. In this way, the head 422 of the handle 42 is pivotally connected to the bolt 48, and could pivot around the shaft 46 between a first position P1 and a second position P2 as shown in FIG. 4. Since a distance between an outer peripheral surface of the shaft 46 and the first surface 422a is greater than a distance between the outer peripheral surface of the shaft 46 and the second surface 422b, the first surface 422a of the head 42 would exerts a force against the block 50 to press the engaging base 24 when the handle 42 is located at the first position P1. Whereby, the engaging base 24 and the support 20 could firmly abut against the stopping surface 203 of the corresponding fixing base 202 through the corresponding O-ring 205. On the other hand, when the handle 42 is located at the second position P2, the second surface 422b of the head 42 would face the engaging base 24, so that the head 42 would no longer press against the engaging base 24, and the engaging base 24 and the support 20 could be moved relative to the suspension fork 200.

Figure 5:
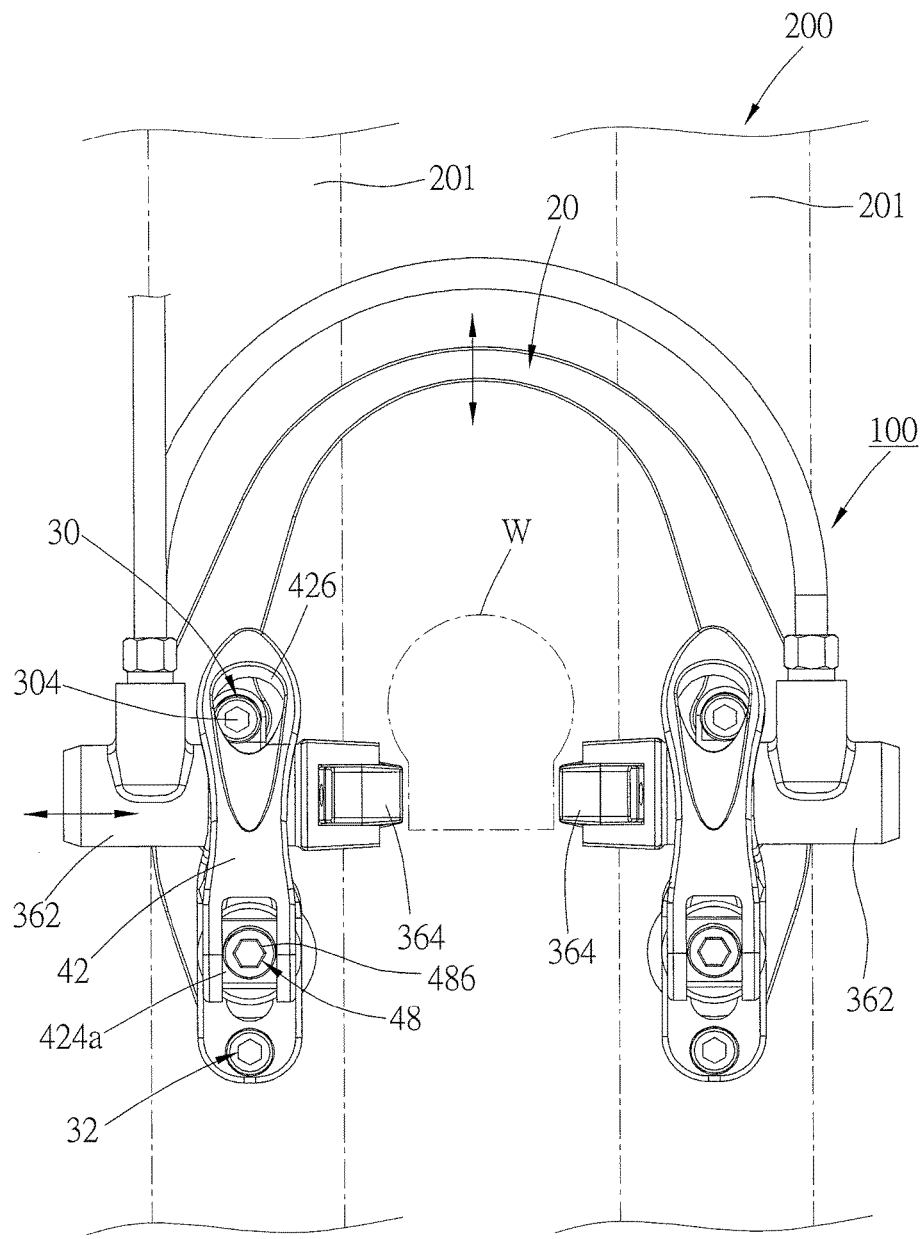
FIG. 5 is a front view of the hydraulic braking device of the first embodiment of the present invention.

In addition, when the handle 42 is located at the first position P1, the driven portion 486 of the bolt 48 would correspond to the side opening 424a, and the driven portion 304 of the first bolt 30 would correspond to the second hollow portion 426 of the handle 42. With such design, a tool (not shown) could be used to rotate the bolt 48 through the first hollow portion 424, adjusting the pressure between the head 422 of the handle 42 and the engaging bases 24. The tool could be also used to loosen the first bolt 30 through the second hollow portion 426, whereby to allow the hydraulic cylinder 362 to be moved. As a result, a distance between the brake pad 364 and the rim of the wheel W could be adjusted (as illustrated in FIG. 5). It is needless to say that the first bolt 30 and the second bolt 32 could be also loosened after the bolt 48 is being slightly loosened. Once the second bolt 32 is loosened, the spring 34 would push the first base 26 and the second base 28 apart, whereby the hydraulic cylinder 362 could be moved to a required position more easily. By fastening the first bolt 30 and the second bolt 32, the hydraulic cylinder 362 could be fixed at the required position. After that, the engaging bases 24 could be fixed on the suspension fork 200 again simply by fastening the bolt 48. In practice, the position of the hydraulic cylinder 362 could also be adjusted by moving the handle 42 to the second position P2 first, and then loosening the first bolt 30 and the second bolt 32 only, without the need to loosen the bolt 48.

Since the first bolts 30 of both of the engaging bases 24 respectively extend into one of the positioning holes 224 on the arms 22, the positions of both of the brake pads 364 could be adjusted at the same time by pulling the handles 42 to the second position P2 or by loosening the bolts 48, whereby the support 20 could be moved upward or downward then (as illustrated in FIG. 5). In this way, the engaging bases 24 on both sides could be moved up and down at the same time, whereby the positions of the brake pads 364 on both sides could be adjusted simultaneously.

In the current embodiment, the hydraulic braking device 100 includes a support 20, two engaging bases 24, two hydraulic brakes 36, and two locking devices 40. In other embodiments, the hydraulic braking device is not necessary to have a support, and the engaging bases could be adjusted individually. In practice, the hydraulic braking device could be provided with only one engaging base, only one hydraulic brake, and only one locking device, yet is still capable of providing the braking function.

Figure 6:
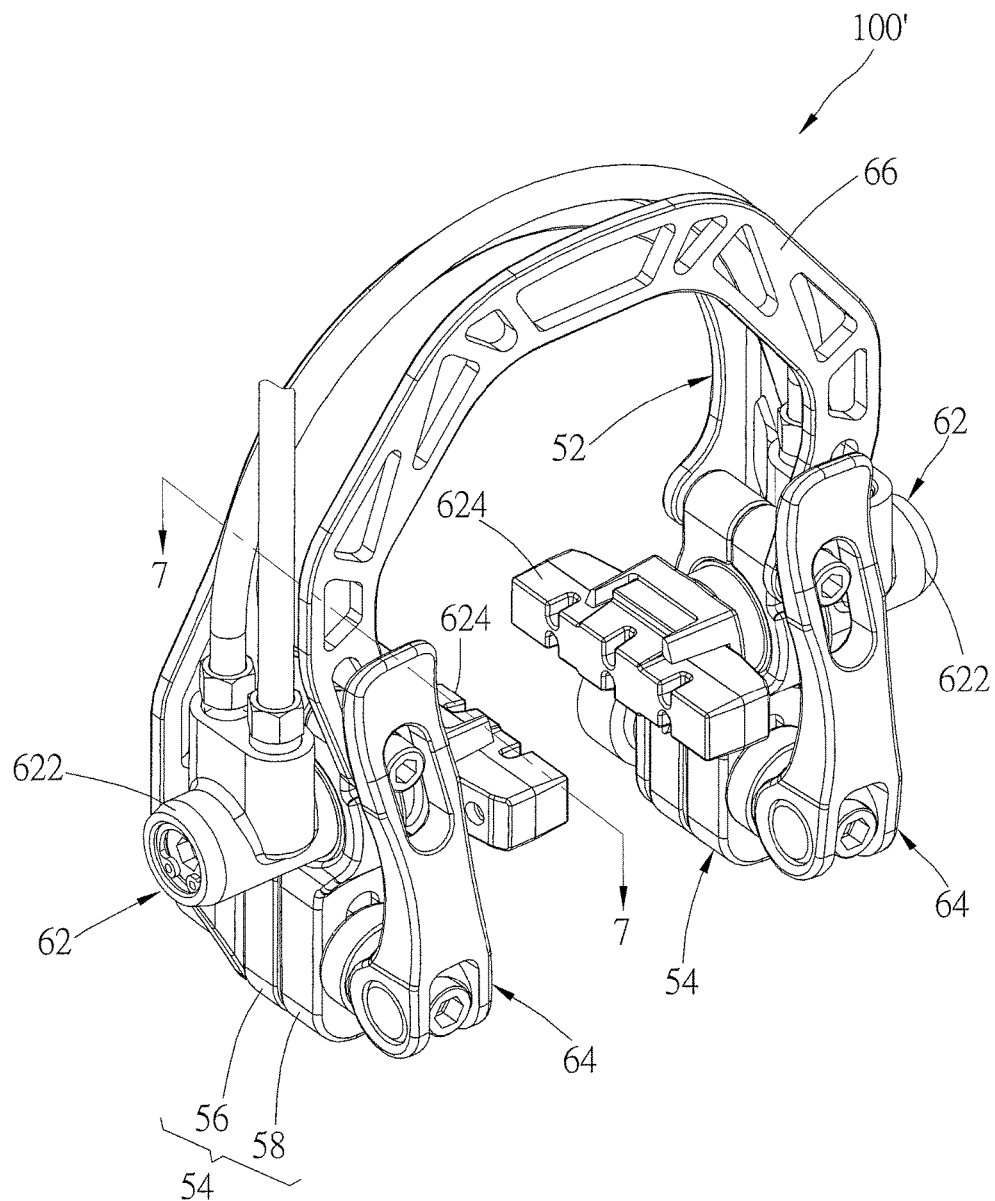
FIG. 6 is a perspective view of the hydraulic braking device of a second embodiment of the present invention.
Figure 7:
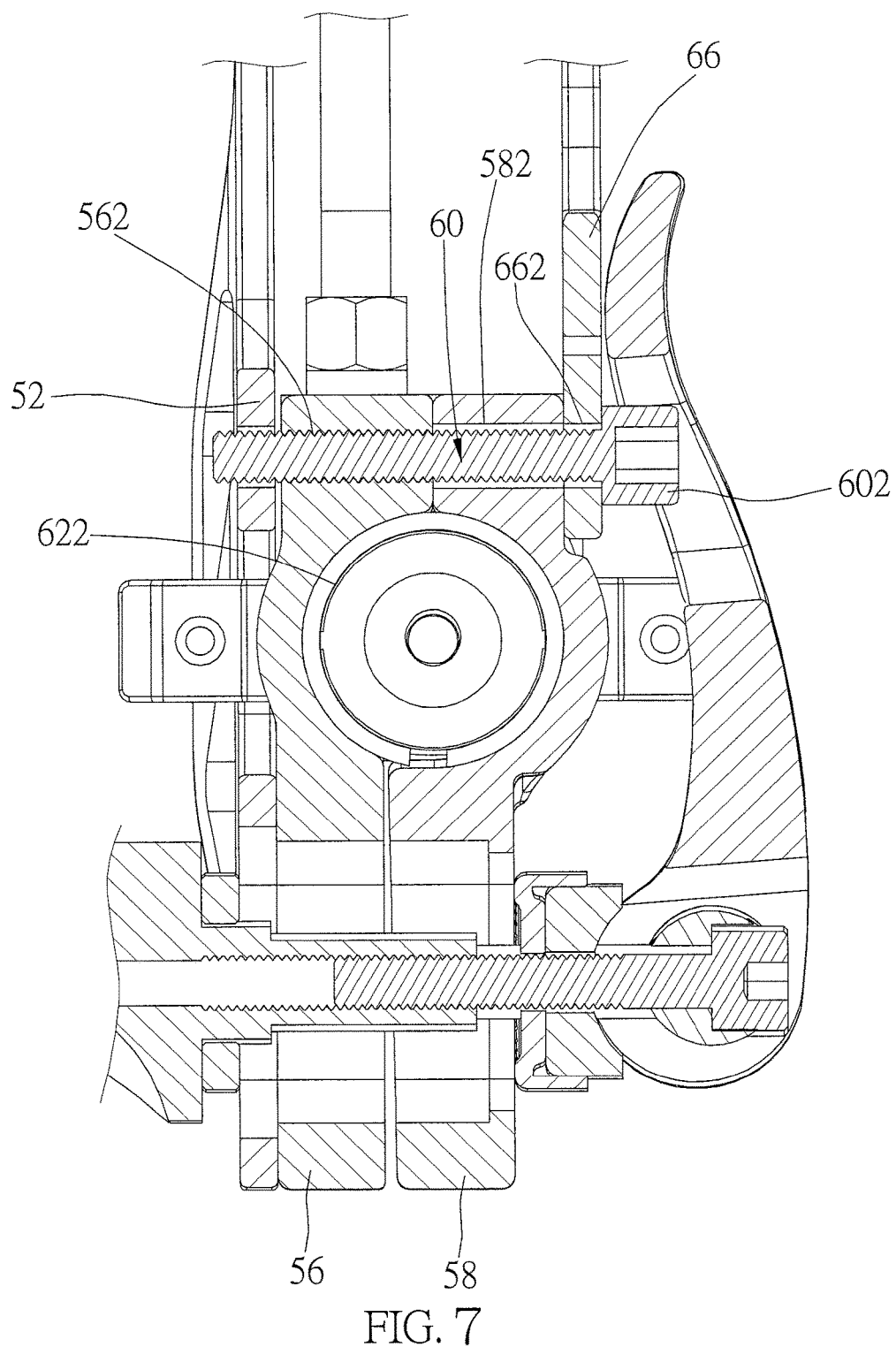
FIG. 7 is a sectional view along the 7-7 line in FIG. 6.
Figure 8:
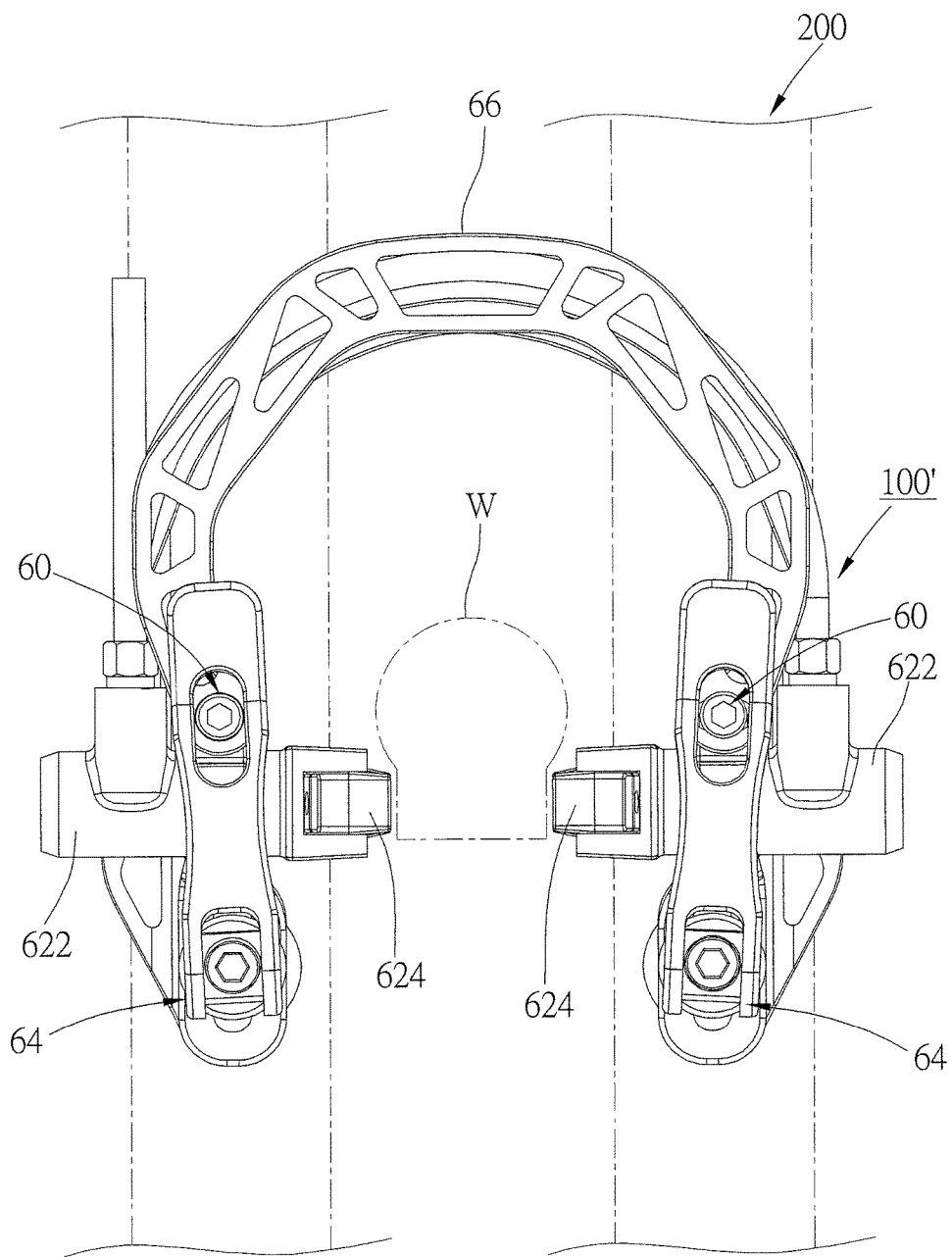
FIG. 8 is a front view of the hydraulic braking device of the second embodiment of the present invention.

As illustrated in FIG. 6 to FIG. 8, a hydraulic braking device 100' of a second embodiment of the present invention includes a support 52, two engaging bases 54, two hydraulic brakes 62, and two locking devices 64. The hydraulic braking device 100' of the second embodiment basically has the same structure as said hydraulic braking device 100 of the first embodiment, except that a first base 56 of each of the engaging bases 54 has no lower tapped hole, and a second base 58 thereof has no lower perforation neither. In addition, each of the engaging bases 54 has no second bolt and spring. Instead, each of the first bases 56 and each of the second bases 58 are fixed together by one of the locking devices 64 and one of the first bolts 60, respectively, whereby to tightly hold each of the hydraulic cylinders 622 between the corresponding first base 56 and the corresponding second base 58. In addition, the hydraulic braking device 100' in the current embodiment further includes another support 66, wherein each of two ends of the another support 66 respectively has a perforation 662. Each of the first bolts 60 of each of the engaging bases 54 passes through one of the perforation 662 of the support 66. An upper perforation 582 of each of the second bases 58 is engaged with an upper tapped hole 562 of one of the first bases 56. A head 602 of each of the first bolts 60 abuts against a peripheral portion of one of the perforations 662 of the support 66 to press against the corresponding second base 58.

When each of the first bolts 60 is loosened, each of the hydraulic cylinders 622 could be moved to change the distance between each of the brake pads 624 and the rim of the wheel W. The method of adjusting vertical positions of the brake pads 624 is the same as illustrated in the first embodiment. Thus we are not going to describe in details herein.

In conclusion, by rotating the bolts of the locking devices to a proper position first, and then pressing the engaging bases by the heads of the handles thereof, the hydraulic braking device of the present invention could easily fix the engaging bases on the suspension fork, effectively fixing the problem that the locking portion of a conventional hydraulic braking device may fail to match the annular recess of the bolt.

It must be pointed out that the embodiments described above are only some preferred embodiments of the present invention. All equivalent structures which employ the concepts disclosed in this specification and the appended claims should fall within the scope of the present invention.

What is claimed is:

1. A hydraulic braking device, which is adapted to be engaged with a suspension fork of a bicycle, wherein the suspension fork has at least one tapped hole; comprising:
    at least one engaging base;
    at least one hydraulic brake which is provided on the at least one engaging base, and comprises a hydraulic cylinder and a brake pad, wherein the brake pad is moveable by the hydraulic cylinder; and
    at least one locking device, which comprises a bolt and a handle, wherein the bolt of each of the at least one locking device is adapted to be screwed into one of the at least one tapped hole after passing through one of the at least one engaging base; the handle of each of the at least one locking device has a cam-shaped head pivotally connected to the corresponding bolt; the handle pivots between a first position and a second position; when the handle is located at the first position, the head presses against one of the at least one engaging base, whereby to fix said engaging base on the suspension fork; when the handle is located at the second position, said engaging base is no longer being pressed against by the head, whereby said engaging base is movable relative to the suspension fork;
    wherein each of the at least one engaging base comprises a first base, a second base matching the first base, and a first bolt; the first base has an upper tapped hole, and the second base has an upper perforation corresponding to the upper tapped hole; the first bolt passes through the upper perforation to be screwed into the upper tapped hole, and a head of the first bolt presses against the second base, holding the hydraulic cylinder between the first base and the second base;
    the first base has a lower tapped hole, and the second base has a lower perforation corresponding to the lower tapped hole; each of the at least one engaging base further includes a second bolt, wherein the second bolt passes through the lower perforation to be screwed into the lower tapped hole;

wherein each of the at least one engaging base has a first elongated hole; a major axis of the first elongated hole is in a vertical direction; the bolt of each of the at least one locking device is adapted to be screwed into one of the at least one tapped hole of the suspension fork after passing through the first elongated hole of one of the at least one engaging base.

2. The hydraulic braking device of claim 1, wherein each of the at least one locking device comprises a shaft passing through the head of the handle; a body of the shaft has a perforation located in a radial direction thereof; the handle has a hollow portion going through the head thereof, and the body of the shaft is located in the hollow portion; the bolt has a head, and passes through the perforation with the head abutting against the shaft.

3. The hydraulic braking device of claim 2, wherein a wall of the perforation of the shaft has an abutted portion; at least a part of the head of the bolt is located in the perforation, and abuts against the abutted portion.

4. The hydraulic braking device of claim 2, wherein the bolt has a driven portion recessed into the head thereof; the hollow portion has a side opening provided on the head of the handle; when the handle is located at the first position, the driven portion corresponds to the side opening.

5. The hydraulic braking device of claim 1, wherein the head of the first bolt has a driven portion recessed thereinto; the handle of each of the at least one locking device has a hollow portion; when the handle is located at the first position, the driven portion of the corresponding first bolt corresponds to the hollow portion of the handle.

6. The hydraulic braking device of claim 5, wherein each of the at least one engaging base further includes a spring; the spring fits around the second bolt, and two ends of the spring respectively abut against the first base and the second base; the hydraulic cylinder is located between the first bolt and the second bolt.

7. The hydraulic braking device of claim 6, wherein the first base has a counterbore; a diameter of the counterbore is greater than a diameter of the lower tapped hole, and the lower tapped hole is located at an inner end of the counterbore; at least a part of the spring is located in the counterbore.

8. The hydraulic braking device of claim 1, further comprising a support, wherein the support has two arms corresponding to each other; each of the arms has a second elongated hole; the at least one tapped hole of the suspension fork comprises two tapped holes respectively located on two tubes of the suspension fork; the at least one engaging base comprises two engaging bases; the at least one hydraulic brake comprises two hydraulic brakes; the at least one locking device comprises two locking devices; each of the first elongated holes and each of the second elongated holes are passed through by one of the tubes; when each of the handles is located at the first position, the head of each of the handles presses against the corresponding engaging base, whereby to fix each of the engaging bases and the support on the suspension fork.

9. The hydraulic braking device of claim 8, wherein each of the arms has a positioning hole located above the second elongated hole; each of the engaging bases comprises a first base, a second base matching the first base, and a first bolt; each of the first bases has an upper tapped hole, while each of the second bases has an upper perforation corresponding to the upper tapped hole of one of the first bases; each of the first bolts passes through the upper perforation of one of the second bases and the upper tapped hole of one of the first bases to be screwed into the corresponding upper tapped hole, extending into one of the positioning holes; a head of each of the first bolts abuts against one of the second bases, whereby to hold one of the hydraulic cylinders between the corresponding first base and the corresponding second base.

10. The hydraulic braking device of claim 1, wherein a surface of the head of the handle of each of the at least one locking device has a first surface and a second surface; a distance between a pivot of the handle and the first surface is greater than a distance between the pivot of the handle and the second surface; when the handle is located at the first position, the first surface of the head presses against one of the at least one engaging base; when the handle is located at the second position, the second surface of the head faces one of the at least one engaging base, whereby, said engaging base is no longer being pressed against by the head.

* * * * *